Oct. 4, 1949.    R. W. MILLER    2,483,659
HOSE FERRULE CLAMPING MACHINE
Filed Sept. 3, 1946
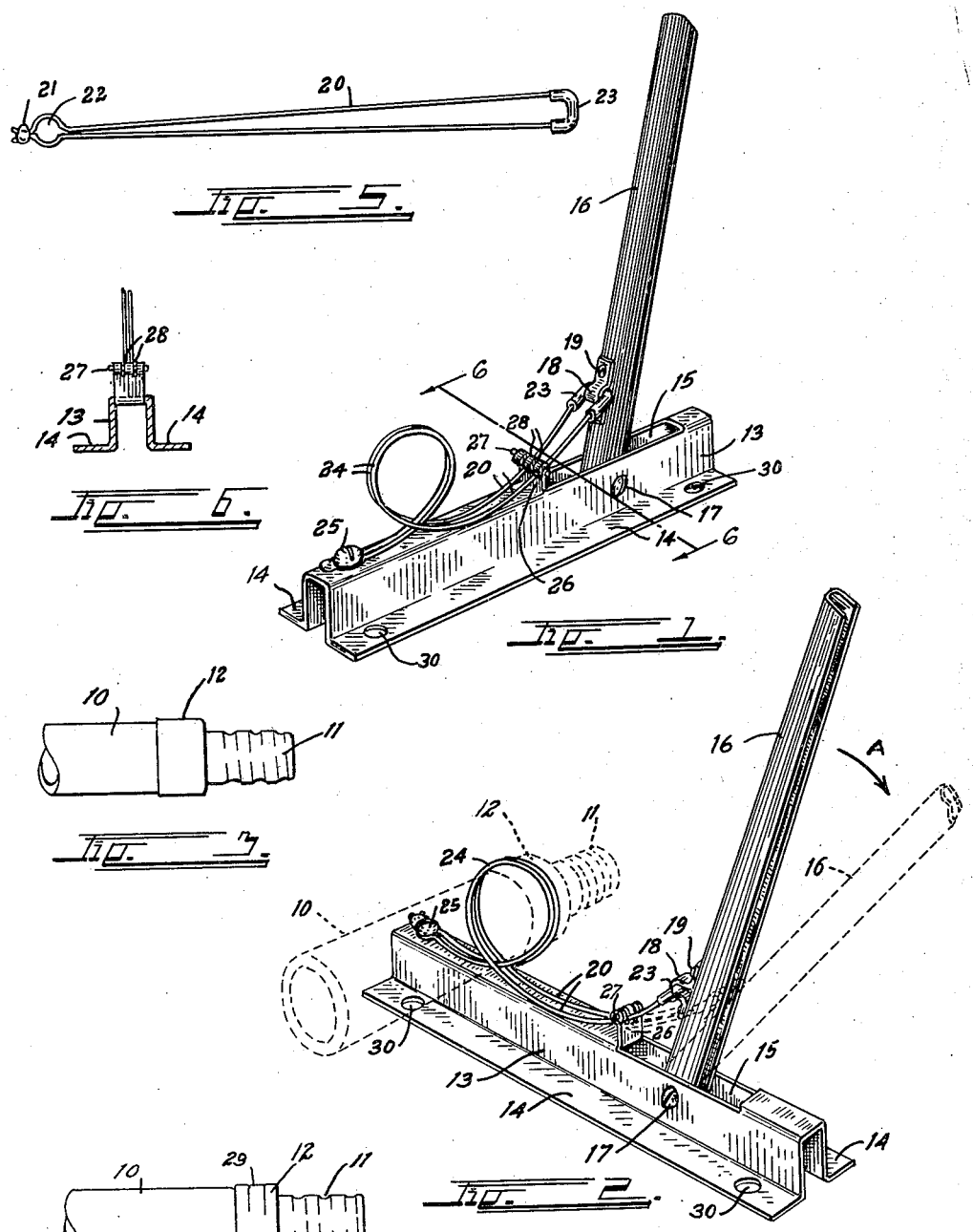
INVENTOR.
ROBERT W. MILLER.
BY
ATTORNEY.

Patented Oct. 4, 1949

2,483,659

UNITED STATES PATENT OFFICE 2,483,659

HOSE FERRULE CLAMPING MACHINE

Robert W. Miller, Denver, Colo.

Application September 3, 1946, Serial No. 694,629

1 Claim. (Cl. 153—1)

This invention relates to a tool for contracting or clamping metal ferrules on the extremities of lengths of rubber hose for securing couplings and fittings therein. The principal object of the invention resides in its simplicity and efficiency.

Another object of the invention is to provide a small, light-weight tool with but a single moving part which will impart uniform pressure to the entire circumference of the ferrule so as to contract it uniformly throughout the entire circumference.

Other objects and advantages reside in the detail contruction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing.

Figs. 1 and 2 are perspective views, looking toward the front and back, respectively, of the improved tool;

Fig. 3 illustrates a typical metal ferrule as used for securing hose couplings;

Fig. 4 illustrates the same ferrule as it would appear after being contracted by this invention;

Fig. 5 illustrates a wire structure as used in the improved tool for the contracting operation; and Fig. 6 is a detail section taken on the line 6—6, Fig. 1.

In Figs. 3 and 4 the extremity of a length of hose is illustrated at 10, with a conventional coupling 11 inserted therein, and a typical brass ferrule is illustrated at 12. The coupling 11 fits snugly into the extremity of the hose 10, and the ferrule 12 fits snugly over the extremity of the hose 10.

To lock the coupling 11 to the hose 10 it is necessary to contract the ferrule 12 on the hose. This is usually done by means of elaborate machinery at the factory where the hose is manufactured. The factory machines are provided with a plurality of clamping dogs which move radially against the coupling to contract it on the hose. These dogs do not give a uniform contracting action around the entire circumferential surface of the ferrule, and the machines are too cumbersome and too expensive for the average user. This improved ferrule contracting tool is a light-weight hand tool which will give uniform contracting action around the entire circumference of the ferrule.

The improved tool comprises an inverted, channel-shaped base member 13 formed of a single length of stamped metal plate and provided with two oppositely extending integral base flanges 14. The base member 13 is slotted, as shown at 15, adjacent one of its extremities for the reception of the lower extremity of a handle 16. The flanges 14 may be provided with screw holes 30, by means of which they may be attached to a work bench or other support.

The handle 16 is also preferably formed of metal plate bent to form a U-shaped channel. The handle is hinged to the base member 13 on a suitable hinge pin or screw 17. A U-shaped removable attachment clip 18 is secured to the handle 16 by means of suitable attachment screws 19.

The actual contracting of the ferrule is accomplished by means of a single length of high tensile strength steel wire 20 such as "piano" wire. The length of wire 20 is bent back upon itself, as shown in Fig. 5, to form a double strand. The two extremities are brazed or otherwise secured together, as shown at 21. Adjacent the point of attachment 21 the wire extremities are bent oppositely outward to form a screw loop 22. A U-shaped friction sleeve 23 is placed about the wire at the bent extremity thereof, as shown in Fig. 5.

In attaching the wire 20 to the tool, the sleeve 23 is clamped in place on the handle 16 by means of the attachment clip 18. The wire is then rolled back upon itself to form an open, circular loop 24. The screw loop 22 is then clamped to the base member 13 by means of a suitable clamp screw 25.

It will be noted that the attached-together extremities of the wire are passed between the portions leading to the sleeve 23 to maintain the two portions of the wire close together throughout the loop 24.

A guide tab 26 is turned upwardly from the metal stamped from the slot 15. This tab is rolled back on itself to form a tubular holder for a guide pin 27. The guide pin serves to hold the two lengths of wire 20 in two guide slots 28 formed in the tab 26.

In use, the extremity of the hose with the nipple 11 and ferrule 12 in place thereon is placed in the loop 24, as shown in broken line Fig. 2. The handle is then swung downwardly, as indicated by the arrow "A", Fig. 2. This provides a leverage which draws upon the bent extremity of the wire 20 to apply tension thereto which contracts the loop 24 around the ferrule 12 with sufficient force to form an annular, deeply indented groove 29 therein which permanently locks the ferrule in place upon the hose.

It will be noted there is only one moving part, the handle 16, unless the wire be considered a moving part. It will also be noted that the wire contracts about the ferrule with uniform pressure at all points of the circumference. Should the wire wear out or break, it is only necessary to remove the screws 19 and 25 and the pin 27 to replace it with a new wire formed as shown in Fig. 5.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A hose ferrule clamping device comprising an elongated inverted, channel-shaped base member, said base member having an opening in its top adjacent one of its extremities; a clamp screw in the top of said base member adjacent its other extremity; an elongated handle extending at its lower extremity into said opening; a hinge pin extending through the sides of said base member and through the lower extremity of said handle to form a hinge pivot for said handle; a guide tab extending upwardly from said base member between said handle and said clamp screw and provided with two guide slots in its upper edge; two adjacent lengths of flexible wire extending from said clamp screw through said guide slots to said handle; means securing said lengths of wire to said handle above said hinge pin, said wires being bent to form an open loop between said clamp screw and said guide tab; the diameter of said loop varying in consequence of the movement of said handle about its hinge pin; and a pin extending through said guide tab transversely of said base member and over said lengths of wire and acting to retain the latter in said guide slots.

ROBERT W. MILLER.

REFERENCES CITED

The following references are of record in the file of this patent:

UNITED STATES PATENTS

| Number | Name | Date |
|---|---|---|
| 761,151 | Cummings | May 31, 1904 |
| 944,423 | Feix | Dec. 28, 1909 |
| 1,039,096 | Christenson | Sept. 24, 1912 |
| 1,519,587 | Lodwick | Dec. 16, 1924 |
| 1,920,791 | Hogan | Aug. 1, 1933 |
| 1,950,678 | Hogan | Mar. 13, 1934 |
| 2,364,628 | Garlinghouse | Dec. 12, 1944 |
| 2,376,351 | Gay | May 22, 1945 |
| 2,427,176 | Aldeen | Sept. 9, 1947 |

FOREIGN PATENTS

| Number | Country | Date |
|---|---|---|
| 37,761 | Denmark | Aug. 1, 1927 |